May 3, 1960 S. G. LATTY 2,934,834
EDUCATIONAL NUMBER SET
Filed Oct. 3, 1956

INVENTOR.
SAMUEL G. LATTY
BY
David Rabin
ATTORNEY

United States Patent Office 2,934,834
Patented May 3, 1960

2,934,834

EDUCATIONAL NUMBER SET

Samuel G. Latty, Orlando, Fla.

Application October 3, 1956, Serial No. 617,676

6 Claims. (Cl. 35—9)

The present invention relates to children's educational toys and more specifically to an educational block in the form of symbol, mark or digit with means associated therewith for introducing a plurality of related symbols to derive associated information. More specifically, the invention may be applied to arithmetical digits to facilitate the teaching of multiplication, division, addition and subtraction.

Children of pre-school age and those in the initial primary grades tend to be bored by conventional toys. Recognition of child guidance and educational devices tend to stimulate the youngster's interest and motivation to learning and these devices have made significant contributions in education. Arithmetic possibly provides the most complex subject matter for children to comprehend. Several attempts have been made to reduce the study of arithmetic to an interesting game which will continuously maintain the interest of young children.

It is, therefore, an object of this invention to provide an educational number set suitable for introducing children to various numbers, symbols and number combinations which is attractive, interesting and amusing.

Yet another object of this invention is the provision of an educational number game in which a basic digit is provided with associated digits, complementary to the basic integer, for producing various arithmetical combinations for multiplication, division, addition and subtraction.

Still another object of the present invention is the provision of a simple device in the form of an integer for housing a plurality of indexed elements having suitable indicia thereon to use in combination with insertable elements for exposing correct answers to an established arithmetical system for the respective digit.

A further object of this invention is to provide an educational toy in which a child will be able to perform simple arithmetic problems and become familiar with number combinations.

Other and further objects and many of the attendant advantages of this novel educational device will become more readily apparent as the invention becomes better understood from the following detailed description taken in conjunction with the accompanying drawing in which like characters of reference designate corresponding parts throughout the several views, and wherein.

Figure 1:
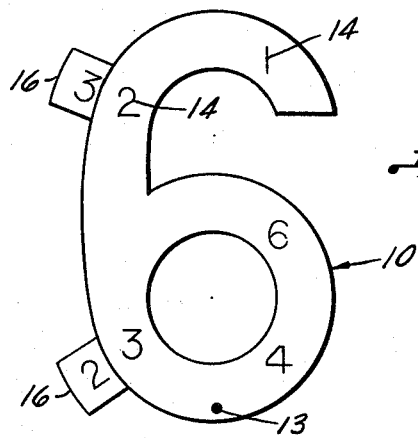
Fig. 1 is a front elevational view of a single digit block housing with two insert elements partially inserted into the block.

Referring to the drawing, there is illustrated in Fig. 1 a block in the form of a digit or numeral 10, which for the purpose of this specification the number six (6) will be employed without intending in any sense as a limitation for the application of other numerals, marks or symbols having the configuration of the designated numeral with the block having adequate thickness to accommodate a plurality of element receiving transverse sockets 11 that are spaced throughout the perimeter of the numeral. On the facial surface 12 of the numeral 10 is a reference marker 13 to indicate the correct orientation of the numeral to a child operating the device. In addition, a number of whole integers or digits 14 positioned on the surface 12 cooperate and identify a specific block receiving socket 11, as will be more clearly evident hereinafter.

Each of the sockets 11 is provided with a transverse indexing keyway 15 which communicates with the open socket and extends directly through the block within the socket to form a passageway for cooperatively receiving and retaining therein an insertable block element 16. Each insertable element 16 is substantially rectangular in plan view and has a projecting transverse indexing key 17 which will be cooperatively received in the corresponding keyway when in the correct socket aligning position as the block element is inserted into a socket 11.

Figure 2:
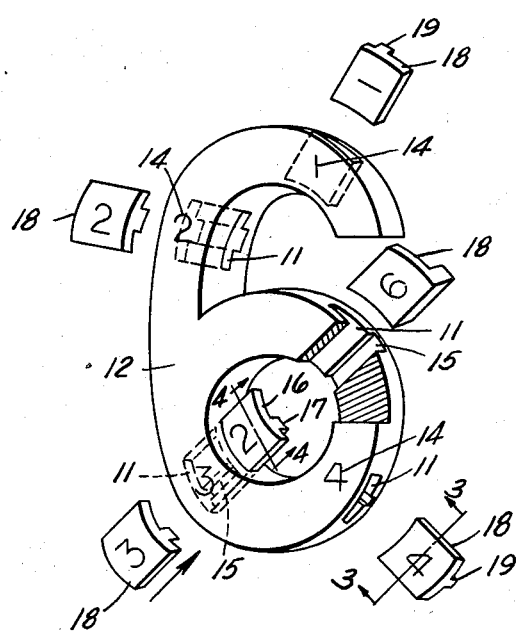
Fig. 2 is an exploded view of the digit block of Fig. 1 with a portion removed to expose an element receiving socket therein.
Figure 4:
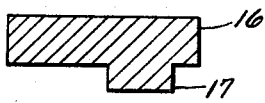
Fig. 4 is an enlarged transverse sectional view of a reference block element taken substantially along the plane of section line 4—4 of a reference block of Fig. 2.
Figure 3:
Fig. 3 is an enlarged transverse sectional view of a key block taken substantially along the section line 3—3 of one key block member of Fig. 2.

It will be readily apparent that each socket 11 will have its indexing keyway in a different location and the keyway on a corresponding identifying element 16 will have the same relative position so that only a correctly selected block element may be inserted into its identifying socket. For example in Fig. 2, block element 16 having the numeral 2 thereon is provided with a key 17 for cooperatively engaging within the slotted keyway 15 in the socket 11 having the identifying digit 3 associated therewith on the surface of the block.

A number of key blocks 18 are employed in conjunction with the block elements 16 and each key block is provided with a key 19 for indexed registration with the keyway 15 in a predetermined socket. Each key block 18 is marked with a number which will correspond to the socket bearing the same identification mark. That is, the key block marked 3 will register within the socket identified by the mark 3.

Initially, the numeral 10 may be pre-loaded for the arithmetical function to be achieved, for example, division by having the answer or reference element 16 placed therein. The numeral block 10 will serve as a common dividend with the pre-loaded insertable elements 16. When inserted into the correct sockets the key blocks 18 act as quotients of the divisors that are correspondingly indicated on the numeral face as markers for each socket. For example, in Fig. 2, the numeral digit six (6) has the reference marks 1, 2, 3, 4 and 6 printed or inscribed thereon and the numbered insertable block elements 16 representing the quotients for the digit 6 when divided by the correct divisor are positioned within the sockets 11. A key block 18 having a key 19 thereon which will be insertable in only one socket that is to correspond with a divisor integer printed on the face of this numeral 10 and will be cooperatively received into the socket corresponding only to the same divisor marking on the numeral.

Upon insertion of the divisor 3 (key block 18) into the socket 11 (marked 3) the block element 16 having the quotient 2 will be exposed indicating the arithmetical answer for the division problem.

For multiplication problems the key blocks 18 may be inserted initially into the sockets 11 and serve as the multiplicand with the numeral 10 acting as the product. The insert block elements 16 may then be employed as the multiplier. Obviously the nomenclature may be modified so that the blocks may be used as in the division example with the inserted elements serving as the multiplicand and the key blocks 18 acting as multipliers.

In the application of addition and subtraction additional key blocks and block elements are to be furnished to complement those already described for each of the sockets to familiarize children with the numerical combinations for each digit.

Although it is contemplated that indexing keys are to be used, the keys may be eliminated completely after the child becomes familiar with the number combinations and it is also proposed to affix the keys to other locations on the blocks in order to reduce the overall number of units required.

Obviously, many modifications and variations may be made in the construction and arrangements of the elements and the configuration of the blocks in the light of the above teachings without departing from the real purpose and spirit of this invention. It is, therefore, to be understood that within the scope of the appended claims many modified forms of structure as well as the use of mechanical equivalents may be reasonably included and modifications are contemplated.

What is claimed is:

1. An educational number set of the character described comprising a digit shaped block, said block having a reference indicium thereon, a reference block bearing a reference character thereon, means in the digit block for cooperatively supporting said reference block and concealing the reference character, and a key member having an indicium corresponding to the block indicium selectively acceptable by said reference block supporting means for exposing the concealed reference character upon acceptance of a key member by said means.

2. An educational number set of the character described comprising a digit-shaped block, said block having arithmetical indicia thereon and a plurality of sockets identified by each of said indicia, a reference block having an indicium corresponding to an arithmetical relation with the digit block slidably receivable in each of the sockets for concealment therein, a key member having indicium thereon correlated to the indicium on said digit block and selectively receivable in one of the sockets to expose a reference block which will provide an arithmetical solution between the digit and the key member.

3. An educational number set of the character described comprising a digit shaped block, said block having a plurality of sockets, each of said sockets being provided with a key block member receiving means, a reference block slidably receivable in each of said sockets, each of said reference blocks having thereon indicia bearing an arithmetical relationship to the digit block, and a key block member having means thereon correlated to mate selectively with the means of one of the sockets whereby upon insertion of the key block member therein the reference block exposes an arithmetical answer.

4. An educational toy of the character described comprising a block having the configuration of a familiar symbol, said block having a plurality of openings therein, an element bearing a known relationship to said symbol receivable in each of said openings and concealed therein, and a key member selectively insertable into an opening to expose the element contained therein, each of said key members and said openings having cooperating means for selective engagement.

5. An educational toy of the character described comprising a block having the configuration of a familiar mark, an element bearing a known relationship to said mark, means for supporting the element in a concealed position in the block, and a key member selectively acceptable to said supporting means to expose the element from a concealed position to reveal the relationship with said mark.

6. An educational number set of the character described comprising a block having the configuration of a digit, said block having a series of transverse block receiving openings, each of said openings having identifying indicia, elements bearing an arithmetical relation to the digit insertable into the digit openings, each of said arithmetical relations differing from each other, said elements being concealed within the openings, and key members having interrelated indicia with said openings selectively receivable in the openings corresponding to each indicia, whereby upon introducing the corresponding key member into its related opening an element concealed therein will be displaced to expose the arithmetical relation between the digit and the key member.

References Cited in the file of this patent

UNITED STATES PATENTS

| | | |
|---|---|---|
| 2,265,699 | Osborne | Dec. 9, 1941 |
| 2,453,265 | Robinson | Nov. 9, 1948 |
| 2,492,571 | Goldfarb | Dec. 27, 1949 |
| 2,609,637 | Spence | Sept. 9, 1952 |
| 2,701,423 | Merrill | Feb. 8, 1955 |

FOREIGN PATENTS

| | | |
|---|---|---|
| 768,450 | Great Britain | Feb. 20, 1957 |